US007995557B2

(12) United States Patent
Li et al.

(10) Patent No.: US 7,995,557 B2
(45) Date of Patent: Aug. 9, 2011

(54) SYSTEM AND METHOD FOR DETERMINING NETWORK QUALITY FOR VOIP CALLS

(75) Inventors: San-Qi Li, Plano, TX (US); Mathew C. Perry, Plano, TX (US); Chen Cao, Lewisville, TX (US); Ya-Nan Long, Plano, TX (US)

(73) Assignee: Genband US LLC, Plano, TX (US)

( * ) Notice: Subject to any disclaimer, the term of this patent is extended or adjusted under 35 U.S.C. 154(b) by 517 days.

(21) Appl. No.: 11/078,247

(22) Filed: Mar. 11, 2005

(65) Prior Publication Data

US 2006/0203801 A1 Sep. 14, 2006

(51) Int. Cl.
*H04L 12/66* (2006.01)
*G08C 15/00* (2006.01)

(52) U.S. Cl. ... 370/352; 370/241; 370/252; 370/395.52; 370/248; 709/224; 709/236

(58) Field of Classification Search .................. 370/352, 370/241, 252, 395.52, 356, 395.21, 233, 370/234, 237, 351, 355, 251, 248, 402, 400; 709/224, 223, 236
See application file for complete search history.

(56) References Cited

U.S. PATENT DOCUMENTS

| | | | |
|---|---|---|---|
| 6,330,316 B1 | 12/2001 | Donak et al. | |
| 6,680,952 B1 * | 1/2004 | Berg et al. | 370/467 |
| 6,683,877 B1 | 1/2004 | Gibbs et al. | |
| 6,735,175 B1 | 5/2004 | Havens | |
| 6,748,433 B1 * | 6/2004 | Yaakov | 709/224 |
| 6,765,921 B1 | 7/2004 | Stacey et al. | |
| 6,799,210 B1 | 9/2004 | Gentry et al. | |
| 6,832,254 B1 | 12/2004 | Scoggins et al. | |
| 7,173,910 B2 * | 2/2007 | Goodman | 370/252 |
| 7,203,172 B2 | 4/2007 | MacArthur et al. | |
| 2002/0085506 A1 * | 7/2002 | Hundscheidt et al. | 370/254 |
| 2002/0131604 A1 * | 9/2002 | Amine | 381/58 |
| 2003/0053463 A1 * | 3/2003 | Vikberg et al. | 370/395.1 |
| 2004/0003400 A1 | 1/2004 | Carney et al. | |
| 2004/0057385 A1 * | 3/2004 | Roshko | 370/252 |

(Continued)

FOREIGN PATENT DOCUMENTS

EP 1487152 A1 12/2004

(Continued)

OTHER PUBLICATIONS

Xiulan Yu et al: "WSCE: a flexible web service composition environment" Web Services, 2004. Proceedings. IEEE International Conference on San Diego, CA, USA, IEEE, Jul. 6, 2004, pp. 428-435, XP010708875, ISBN: 0-7695-2167-3.

(Continued)

*Primary Examiner* — Aung S Moe
*Assistant Examiner* — Jamal Javaid
(74) *Attorney, Agent, or Firm* — Jenkins, Wilson, Taylor & Hunt, P.A.

(57) ABSTRACT

A method of measuring network quality for VoIP calls comprises setting up a test call from a local IP endpoint to a remote IP endpoint reachable by a logical trunk group associated with the local IP endpoint, receiving statistical data regarding the test call, tearing down the test call, processing the statistical data and generating measurement results, and routing a VoIP call using a route selected based at least in part on the measurement results.

20 Claims, 3 Drawing Sheets

U.S. PATENT DOCUMENTS

| | | | |
|---|---|---|---|
| 2004/0062204 A1 | 4/2004 | Bearden et al. | |
| 2004/0177335 A1 | 9/2004 | Beisiegel et al. | |
| 2004/0240389 A1 | 12/2004 | Bessis et al. | |
| 2004/0252646 A1* | 12/2004 | Adhikari et al. | 370/252 |
| 2005/0083844 A1 | 4/2005 | Zhu et al. | |
| 2006/0203803 A1 | 9/2006 | Perry et al. | |
| 2006/0245350 A1 | 11/2006 | Shei et al. | |
| 2007/0183339 A1* | 8/2007 | Rousell et al. | 370/252 |
| 2007/0280123 A1* | 12/2007 | Atkins et al. | 370/252 |

FOREIGN PATENT DOCUMENTS

| | | |
|---|---|---|
| WO | WO 02/05068 A2 | 1/2002 |
| WO | WO 2004/012403 A1 | 2/2004 |
| WO | WO 2004/030288 A1 | 4/2004 |
| WO | WO 2006/095256 A2 | 9/2006 |
| WO | WO 2005-022844 A1 | 10/2006 |

OTHER PUBLICATIONS

European Search Report for EP Patent Application No. 05101955.2, Nov. 9, 2005, 7 pages, European Patent Office.

International Search Report and Written Opinion of the international Searching Authority mailed Aug. 31, 2006 for PCT Application No. PCT/IB2006/000537, 12 pages.

Busse, Ingo, et al., "Dynamic QoS Control of Multimedia Applications Based on RTP" dated May 30, 1995, Retrieved from Internet www.cs.ucsb.edu/~ebelding/courses/276/f04/papers/Schulzrinne_RTP.ps.gz, printed on Aug. 17, 2006, 13 pages.

Official Action for U.S. Appl. No. 11/078,531 (Dec. 24, 2008).
Final Official Action for U.S. Appl. No. 11/078,531 (Jul. 9, 2008).
Interview Summary for U.S. Appl. No. 11/078,531 (May 1, 2008).
Official Action for U.S. Appl. No. 11/078,531 (Jan. 18, 2008).
International Search Report and Written Opinion of the International Searching Authority for PCT Application No. PCT/IB2006/000528 (Jan. 29, 2007).
Final Official Action for U.S. Appl. No. 11/078,531 (Jun. 10, 2009).
Interview Summary for U.S. Appl. No. 11/078,531 (Apr. 14, 2009).
Interview Summary for U.S. Appl. No. 11/078,531 (Sep. 30, 2009).
Final Official Action for U.S. Appl. No. 11/078,531 (Jun. 22, 2010).
Interview Summary for U.S. Appl. No. 11/078,531 (May 18, 2010).
Official Action for U.S. Appl. No. 11/078,531 (Jan. 5, 2010).
Interview Summary for U.S. Appl. No. 11/078,531 (Jan. 19, 2011).
Official Action for U.S. Appl. No. 11/078,531 (Nov. 9, 2010).

* cited by examiner

SYSTEM AND METHOD FOR DETERMINING
NETWORK QUALITY FOR VOIP CALLS

BACKGROUND

Connectivity and voice quality are key reliability issues in today's VoIP (voice over Internet Protocol) networks. Today's VoIP users increasingly expect the Quality of Service (QoS) of the call to be equal or close to that of the Public Switched Telephone Network (PSTN). Because network conditions may change rapidly and continuously, connectivity for a VoIP call cannot be guaranteed. Further, problems that may be commonly encountered in an IP network such as packet loss, packet delay, and out of order packet delivery may lead to deteriorating quality of VoIP voice calls.

Unlike data connections, a real-time application like voice calls place much stricter requirements on packet delivery sequence and timing. Significant packet loss, packet delay, and out of order delivery problems make telephone conversations difficult. Users may experience echoes and talker overlap that are perceived as significant indicators of inferior QoS.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
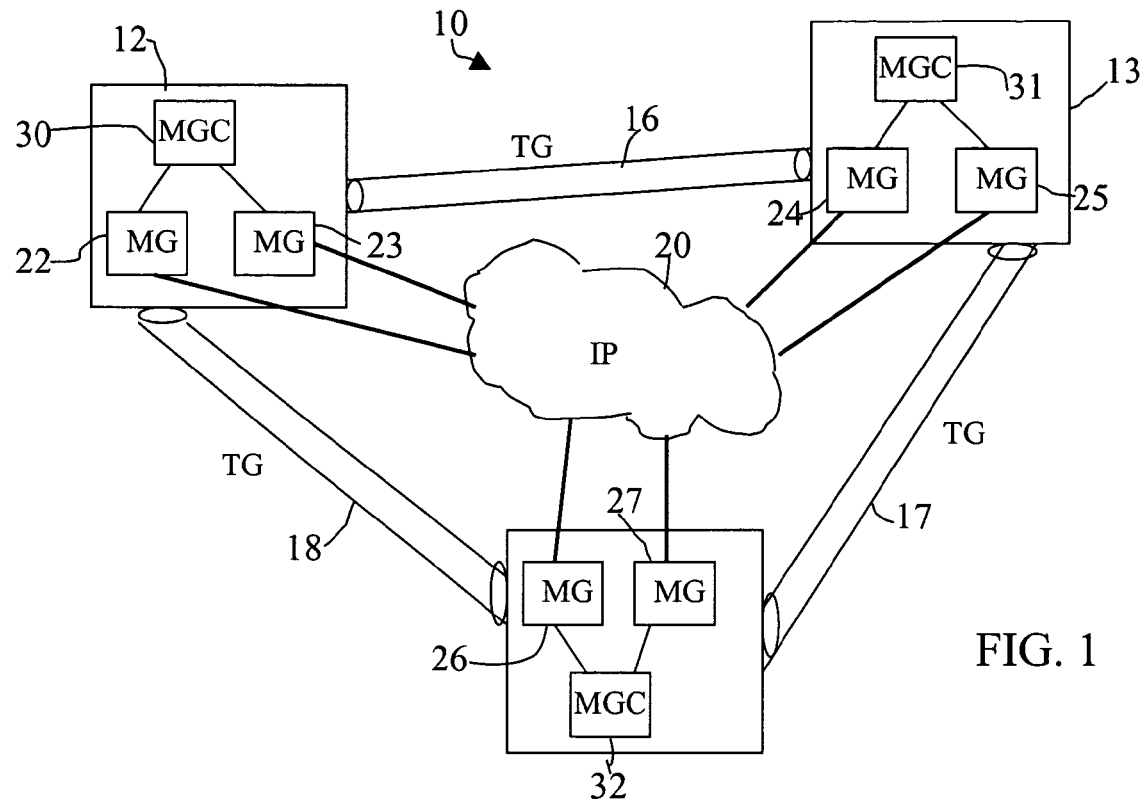
FIG. 1 is a simplified block diagram of an embodiment of a VoIP network.

It is to be understood that the following disclosure describes many different examples for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations unless otherwise specified.

FIG. 1 is a simplified block diagram of an embodiment of a VoIP network 10. VoIP network 10 is shown comprising a plurality of media gateway nodes 12-14 interconnected by logical trunk groups 16-18 and the Internet 20, however, it should be understood that the network configuration shown in FIG. 1 is merely exemplary. Logical trunk groups 16-18 comprise a plurality of circuits or transmission channels that are capable of interconnecting telephony calls. Media gateway nodes 12-14 each comprises a plurality of multimedia media gateways (MG) 22-27 coupled to a multimedia gateway controller (MGC) 30-32, which is sometimes referred to as a softswitch. Multimedia gateways 22-27 each may comprise one or more switching fabric of the same or different types for routing telephony calls. The switching fabrics may be packet-switching matrices and/or non-packet switching matrices. The multimedia gateways may be coupled to their respective multimedia gateway controller via an ATM (Asynchronous Transfer Mode) or IP (Internet Protocol) backbone network, for example. Multimedia gateway controllers 30-32 provides call processing control and user interface functions for TDM (Time Division Multiplex), ATM, IP, and other traffic processed, switched and routed by multimedia gateways 22-27. The multimedia gateways coupled to a multimedia gateway controller may be geographically distributed. The VoIP bearer path between the media gateway nodes may comprise ATM, MPLS (Multi-Protocol Label Switching), IP, or other bearer paths. VoIP network 10 enables two users using IP telephone devices such as a telephone operating pursuant to SIP (Session Initiation Protocol) or another suitable protocol to communicate with one another.

The multimedia gateway nodes may convert data from a format, protocol, and/or type required for one network to another format, protocol, and/or type required for another network, and/or otherwise convert data from a first type of data on a first transmission link to a second type of data on a second transmission link. The multimedia gateway nodes may terminate channels from a circuit-switched network and pass streaming media for a packet-switched network, such as Real-Time Transport Protocol (RTP) streams transported via User Datagram Protocol (UDP) in an IP network. Input data for the media gateway may include audio, video, and/or T.120 (real-time multi-point communications), among others, which the media gateway may handle simultaneously or otherwise.

Figure 2:
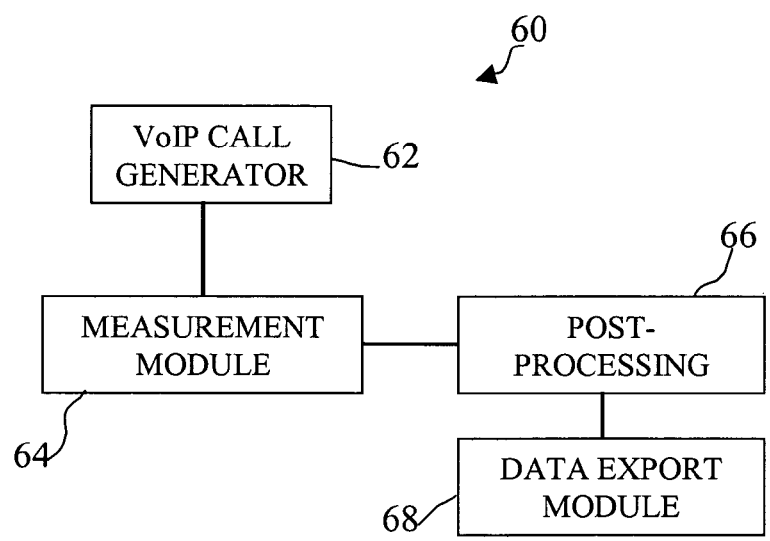
FIG. 2 is a simplified logical block diagram of an embodiment of a system for VoIP test calls.
Figure 3:
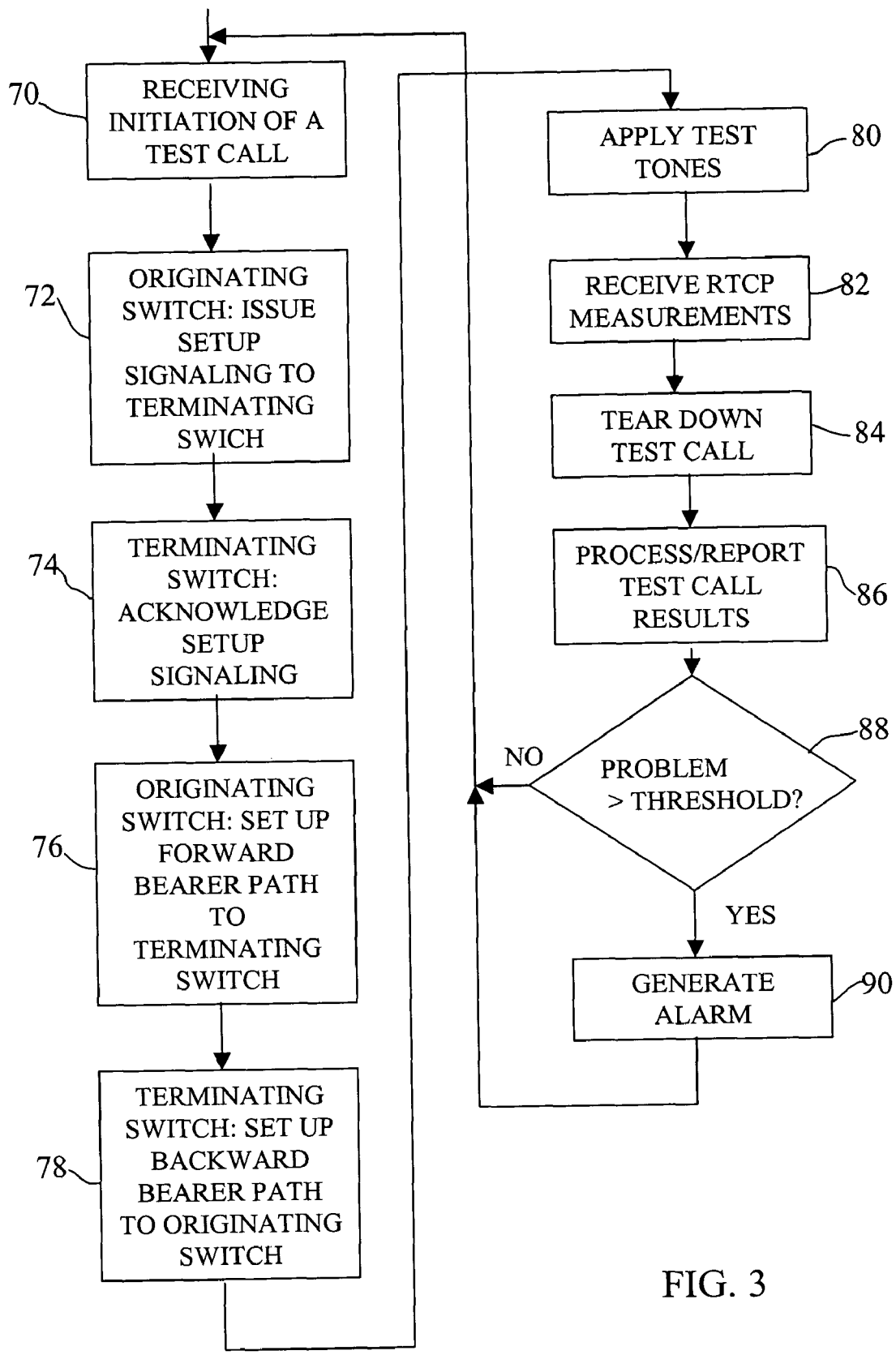
FIG. 3 is a simplified flowchart of an embodiment of a method for VoIP test calls.

FIG. 2 is a simplified logical block diagram of an embodiment of a system for VoIP test calls 60. System 60 may reside in data measurement module 44 of system 40 or is operable to communicate with system 40 by exporting data thereto. System 40 will be described in greater detail below with respect to FIG. 4. System 60 comprises interconnected VoIP call generator 62, a measurement module 64, a data post-processing module 66, and a route data export module 68. The operations of system 60 are hereinafter described with reference to FIG. 3. FIG. 3 is a simplified flowchart of an embodiment of a method for VoIP test calls. In step 70, system 40 receives an indication from a user to perform periodic test calls to identified targets. For example, the user may provide or otherwise input or select a logical trunk group identifier (ID), a local multimedia gateway ID based on a caller telephone number, and a remote multimedia gateway ID based on a called party telephone number. Although the test call will be performed periodically, they are performed continuously with sufficiently short periods as to provide an accurate picture of network conditions. In step 72, the originating switch of the local multimedia gateway is then instructed by its multimedia gateway controller to generate and transmit signaling set up messages of the test call to the terminating switch of the remote multimedia gateway. In step 74, the terminating switch sends an acknowledgement of receiving the set up signaling message(s). In steps 76 and 78, the test call originating switch proceeds to set up the forward bearer path to the terminating switch, and the terminating switch proceeds to set up the backward bearer path to the originating switch. The call setup messaging may be performed pursuant a standard protocol now known or to be developed.

Continuing on to step 80, test tones are generated and applied at both switches to provide test call bearer path traffic. In step 82, periodic report packets generated pursuant to RTP Control Protocol (RTCP) at the originating switch and/or the terminating switch are collected and examined to determine path conditions by a RTP/RTCP stack resident in measurement module 64. The RTCP report packets are transmitted using the same distribution mechanism as the data packets. RTP and RTCP are transport layer protocols situated below the application layer. According to RTCP, receiver reports and sender reports containing statistics such as the number of packets transmitted, the number of packets lost, an estimation of jitter, the last packet sequence number received, packet time stamp of the last sender report, and delay since the last sender report received are provided. The RTCP reports are used to obtain measurements of the network condition, and after a sufficient number of measurements have been obtained, the test call may be torn down by the originating switch in step 84. VoIP call generator 62 may be responsible for the test call setup and tear down steps described above, and measurement module 64 may be responsible for collecting and examining the RTCP report data. Thereafter, the test call results may be processed by post-processing module 66 in step 86. The test call data may be averaged, smoothed, filtered and otherwise processed to eliminate anomalies and outliers so that a more accurate picture of the bearer path conditions is presented. The processed data may also be exported or otherwise made available to system 40, which uses this information to formulate a route list. The processed test call results may also be exported to other network management entities. The processed test call results may be exported in a generic format readable by a number of applications.

According to the processed data, if the measurements indicate that congestion or other network problems are greater than a predetermined threshold, as determined in step 88, then an alarm may be generated in step 90. The alarm may be used to notify users or craft personnel or it may be used to alert routing engine 40 to avoid using particular paths. If the congestion is below the threshold, then system 60 may proceed to make another test call. If a previously congested path is now measured as being below the threshold, the previously issued alarm may be cleared so that the route can be used for voice calls. Alternatively, test call measurement data may be compared to multiple threshold levels to determine whether the congestion reached minor, major or critical levels. An alarm may be generated when one or each of these threshold levels has been reached.

Voice calls may be routed using the best route (e.g. uncongested and connectivity) established by using test call results. The resultant VoIP calls have improved voice quality and provide users with enhanced call experience. The test call results may be provided to other network management and routing equipment/software to further optimize the data network. Details of an example of how the measurement results may be used may be found in co-pending U.S. patent application Ser. No. 11/078,531, entitled "System and Method for Routing VoIP Calls," formerly, incorporated herein by reference.

As employed herein, the term "network" may be used to refer to an entire network or to a network portion, a network application, and/or network apparatus. To that end, one or more instances of the multimedia gateway and/or softswitch, or components thereof, may be singularly or collectively employed to bridge two or more networks, including those of PSTNs and voice-over-packet (VoP) networks, among others. PSTN networks may employ TDM, among other non-packet formats and/or protocols. VoP networks may employ ATM, VoIP, universal-mobile-telecommunications-service (UTMS), code-division-multiple-access (CDMA, such as CDMA2000 and/or W-CDMA), voice-over-digital-subscriber-line (VoDSL), other formats and/or protocols, and/or combinations thereof.

Figure 4:
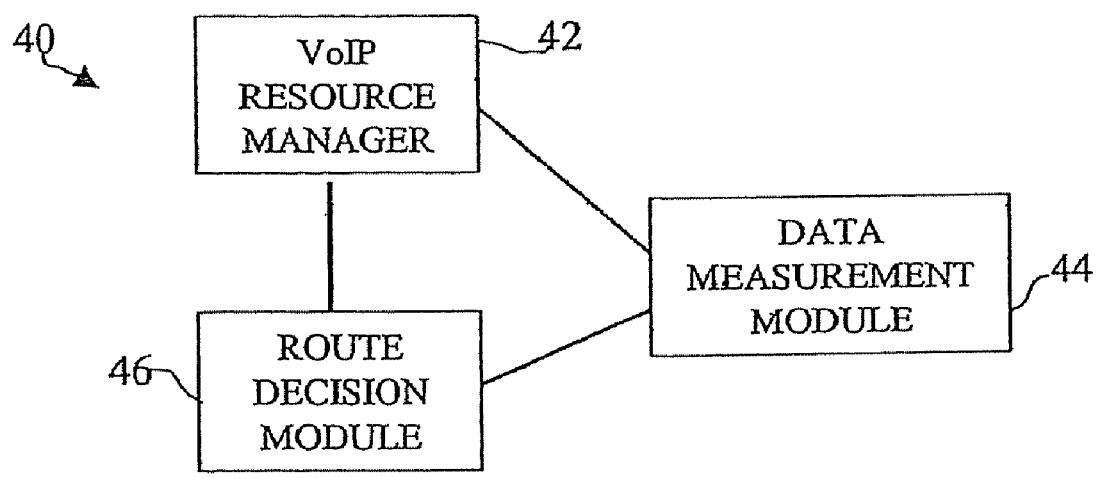
FIG. 4 is a simplified logical block diagram of an embodiment of a system for VoIP call routing.

FIG. 4 is a simplified logical block diagram of an embodiment of a system for VoIP call routing 40. System 40 may reside within each multimedia gateway controller. System 40, which may also be referred to as a VoIP call routing engine, comprises at least three logical modules: a VoIP resource manager 42, a data measurement module 44, and a route decision module 46. System 40 is operable to intelligently route VoIP calls around segments of the network that experience congestion, link failure, node failure or other problems. Because voice calls are very sensitive to adverse network conditions that cause packet delay, out-of-order delivery, packet loss, and other problems, the avoidance of congested network segments significantly improves the QoS of the VoIP call.

What is claimed is:

1. A method of automatically routing VoIP calls based on network quality measurements, comprising:
    setting up, by a multimedia media gateway controller, a test call from an originating switch of a local media gateway to a terminating switch of a remote media gateway reachable by a logical trunk group associated with the originating switch of a local media gateway;
    receiving, by the multimedia media gateway controller, statistical data regarding the test call;
    tearing down, by the multimedia media gateway controller, the test call;
    processing, by the multimedia media gateway controller, the statistical data and generating, by the multimedia media gateway controller, measurement results;
    automatically determining, at the multimedia media gateway controller, a best route for a VoIP call based on the measurement results and routing the VoIP call using the best route;
    determining, by the multimedia media gateway controller, whether the measurement results indicate congestion on a path in a network; and
    in response to determining that the measurement results indicate congestion on the path, generating, by the multimedia media gateway controller, an alarm so that the path can be avoided.

2. The method of claim 1, comprising continually repeating the steps.

3. The method of claim 1, further comprising:
    comparing the measurement results to a predetermined threshold;
    generating an alarm response to the predetermined threshold being exceeded.

4. The method of claim 1, further comprising:
    comparing the measurement results to a plurality of predetermined thresholds;
    generating an alarm in response to any of the predetermined thresholds being exceeded.

5. The method of claim 1, wherein receiving statistical data comprises receiving RTCP reports.

6. The method of claim 1, wherein processing the statistical data comprises smoothing the statistical data.

7. The method of claim 1, wherein receiving statistical data compromises receiving data associated with packet loss, packet delay, and jitter measured during the test call.

8. The method of claim 1, wherein setting up a test call comprises:
    controlling at least one of the local and remote media gateways for:
        sending setup signaling from the originating switch of the local media gateway to the terminating switch of the remote media gateway; and sending setup signaling from the terminating switch of the remote media gateway to the originating switch of the local media gateway.

9. The method of claim 1, further comprising generating and applying test tones to the test call.

10. A method of measuring network quality, comprising:
setting up, by a multimedia media gateway controller, a test call from an originating switch of a local media gateway to a terminating switch of a remote media gateway;
collecting, by the multimedia media gateway controller, packet delivery statistical data of the test call;
tearing down, by the multimedia media gateway controller, the test call;
filtering, by the multimedia media gateway controller, the statistical data and generating network condition measurement results;
exporting, by the multimedia media gateway controller, the network condition measurement results;
by the multimedia media gateway controller, routing a VoIP call using a route selected based at least in part on the network condition measurement results;
determining, by the multimedia media gateway controller, whether the measurement results indicate congestion on a path in a network; and
in response to determining that the measurement results indicate congestion on the path, generating, by the multimedia media gateway controller, an alarm so that the path can be avoided.

11. The method of claim 10, comprising continually repeating the steps.

12. The method of claim 10, further comprising:
comparing the network condition measurement results to at least one predetermined threshold; and
generating an alarm in response to the at least one predetermined threshold being exceeded.

13. The method of claim 10, wherein filtering statistical data comprises smoothing the statistical data.

14. The method of claim 10, wherein setting up a test call comprises:
controlling at least one of the local and remote media gateways for:
sending setup signaling from the originating switch of the local media gateway to the terminating switch of the remote media gateway; and
sending setup signaling from the terminating switch of the remote media gateway to the originating switch of the local media gateway.

15. The method of claim 10, further comprising generating bearer traffic for the test call.

16. The method of claim 10, wherein receiving packet delivery statistical data comprises receiving RTCP reports.

17. The method of claim 10, further comprising generating a routing list based at least in part on the network condition measurement results.

18. A system comprising:
a test call generator in a multimedia gateway controller for setting up a test call from an originating switch of a local media gateway to a terminating switch of a remote media gateway;
in the local media gateway, generating bearer traffic for the test call;
a measurement component in the multimedia gateway controller for collecting and receiving statistical data associated with the test call;
in the multimedia gateway controller, processing the statistical data and generating measurement results;
a routing component in the multimedia media gateway controller for determining a best route for a VoIP call based on the measurement results and routing the VoIP call using the best route;
in the multimedia media gateway controller, determining whether the measurement results indicate congestion on a path in a network; and
in the multimedia media gateway controller, in response to determining that the measurement results indicate congestion on the path, generating an alarm so that the path can be avoided.

19. A system for measuring IP network quality, the system comprising:
a multimedia media gateway controller including:
a test call generator, in the multimedia media gateway controller, operable to set up a test call from an originating switch of a local media gateway to a terminating switch of a remote media gateway, and to control at least one of the media gateways to generate bearer traffic for the test call;
a measurement component, in the multimedia media gateway controller, operable to collect and receive statistical data associated with the test call;
a post-processing component, in the multimedia media gateway controller, coupled to the measurement module operable to filter the statistical test call data; and
a routing engine in the multimedia media gateway controller for using the statistical test call data to route a VoIP call, wherein the multimedia media gateway controller is configured to determine whether the measurement results indicate congestion on a path in a network, and, in response to determining that the measurement results indicate congestion on the path, to generate an alarm so that the path can be avoided.

20. The system of claim 19, further comprising a data export module coupled to the post-processing module and configured to export the filtered statistical test call data in a predetermined format.

* * * * *